J. E. MEED.
SAW FILING MACHINE.
APPLICATION FILED SEPT. 11, 1920.

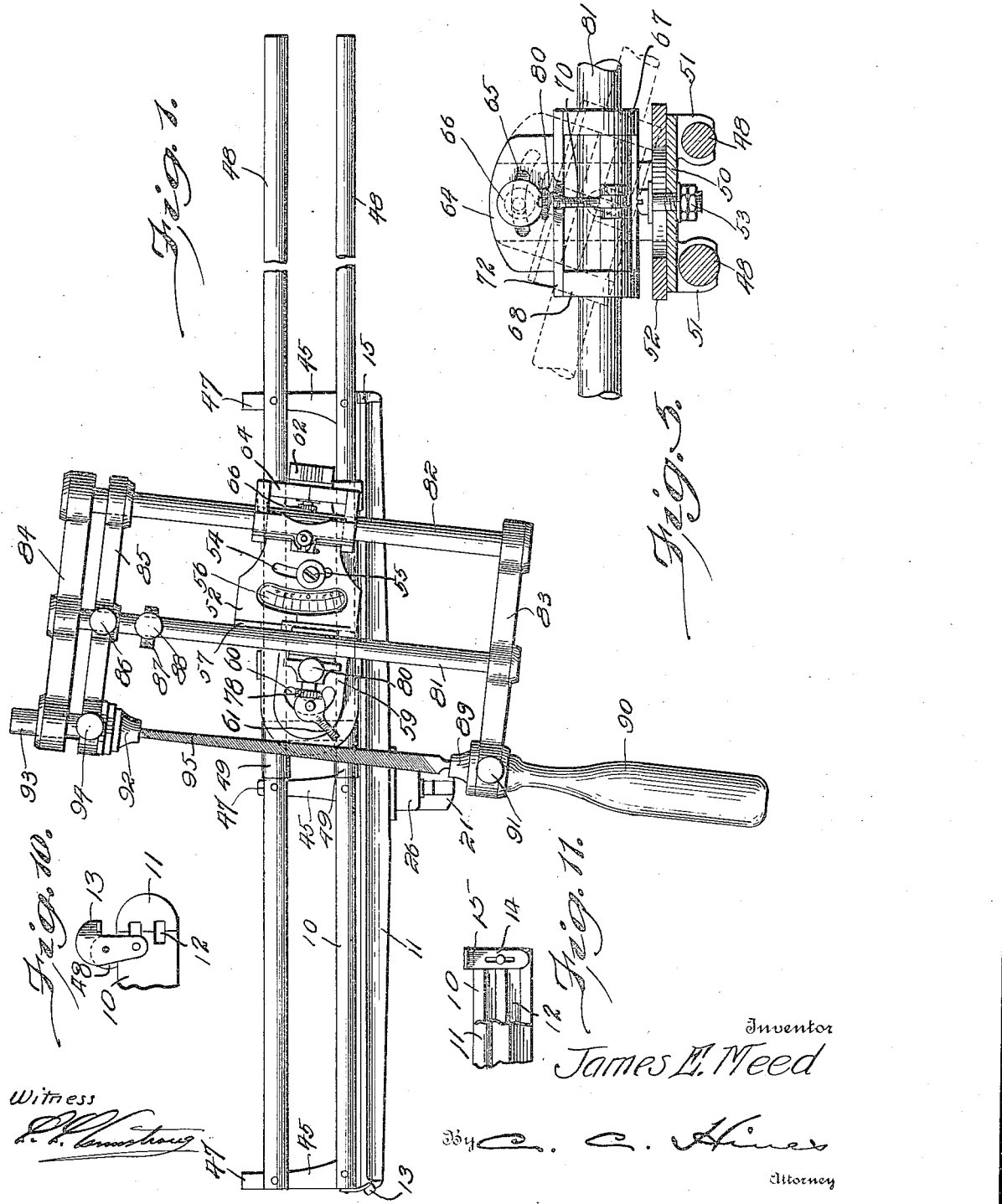

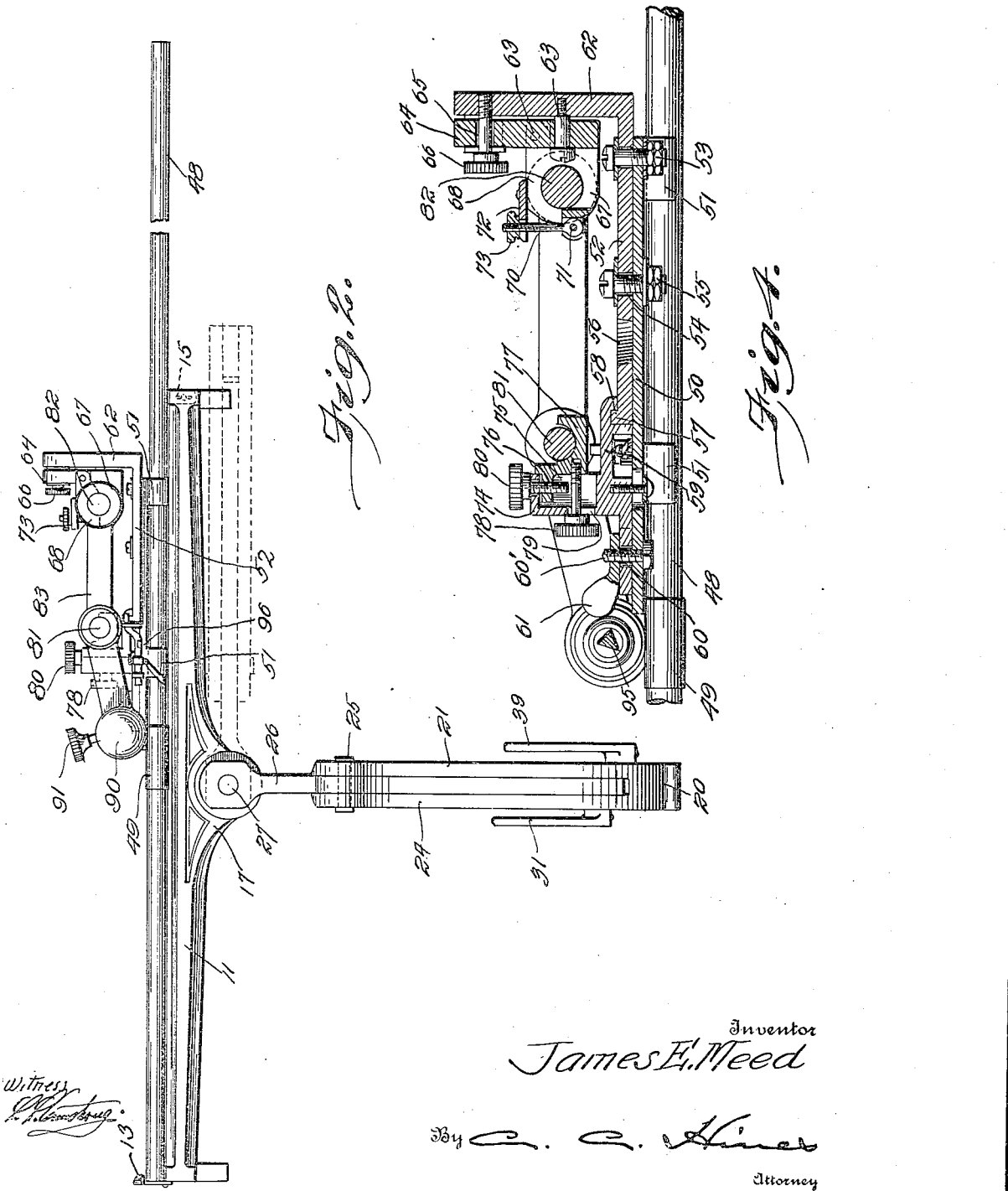

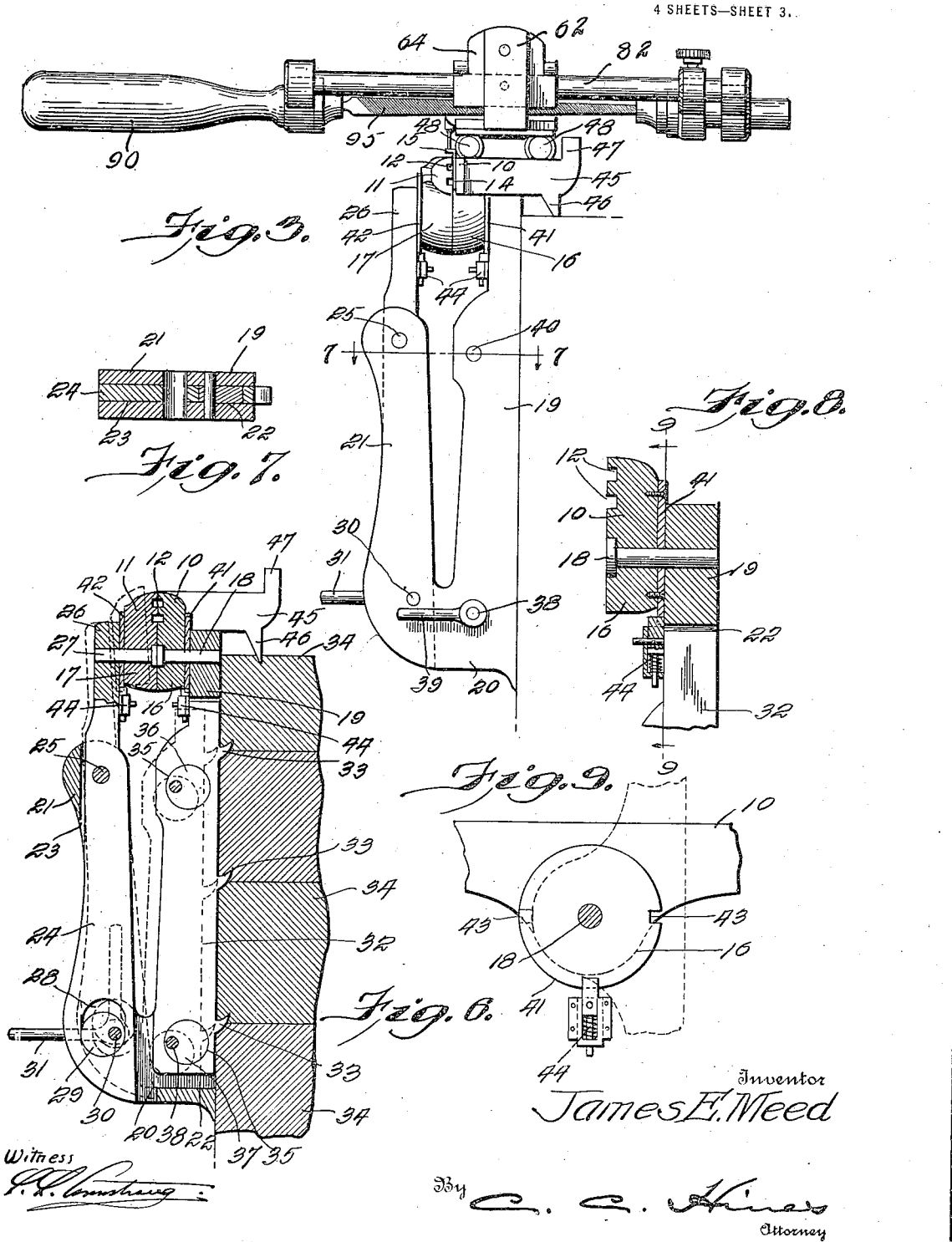

1,425,602.

Patented Aug. 15, 1922.
4 SHEETS—SHEET 4.

Inventor
James E. Meed.

Witness

By
Attorney

UNITED STATES PATENT OFFICE.

JAMES E. MEED, OF PALESTINE, WEST VIRGINIA.

SAW-FILING MACHINE.

1,425,602.    Specification of Letters Patent.    Patented Aug. 15, 1922.

Application filed September 11, 1920. Serial No. 409,606.

*To all whom it may concern:*

Be it known that I, JAMES E. MEED, a citizen of the United States, residing at Palestine, in the county of Wirt and State of West Virginia, have invented new and useful Improvements in Saw-Filing Machines, of which the following is a specification.

The invention relates to improvements in saw filing machines.

The primary object of the invention is to provide an apparatus of the type mentioned, and one of substantial construction and arrangement for extremely efficient and accurate work, and, at the same time is easily portable from one point to another and readily set up for operation without resorting to the use of special mountings or supports.

A further object of the invention is to provide for a machine of the character specified, and one in which the working parts thereof are accurately set for operation by means of simple but efficient mechanisms of maximum range of adjusting movement.

Another object of the invention is to provide for a machine of the type set forth, and one which is provided with a special form of fastening means whereby the same may be mounted or supported for use on timbers, walls, or other similar or desired supports, of varying size, thickness, width, or height, such as are usually found to be present during building and construction operations.

A still further object of the invention is to provide a machine of the class described, and one in which the movable file carrying part or carriage is automatically fed intermittently and progressively forward and into position for the cutting or sharpening of the teeth of a saw successively, the feed mechanism being arranged to be reversed so as to move the carriage either from right to left or vice versa as may be desired or necessary for the proper sharpening or shaping of the teeth of the saw.

Figure 12:
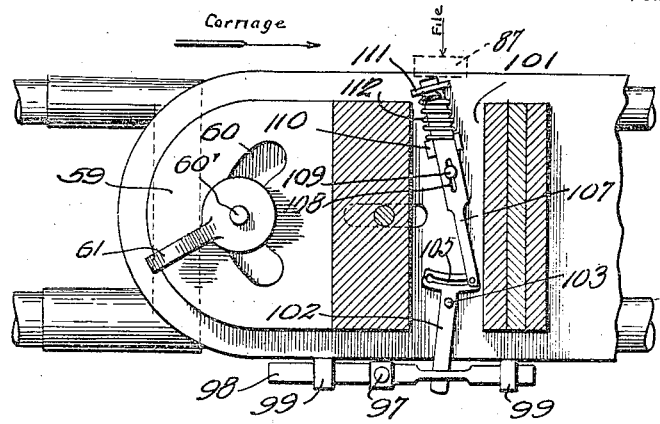
Figure 13:
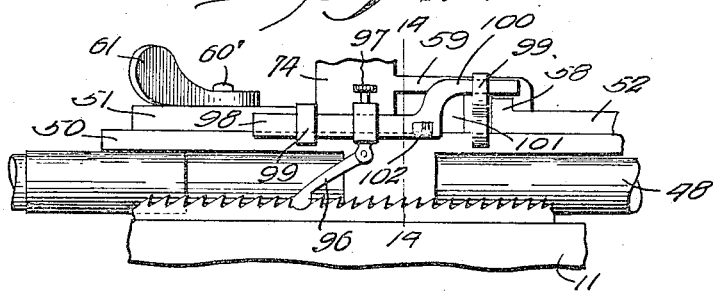
Figures 14, 15:
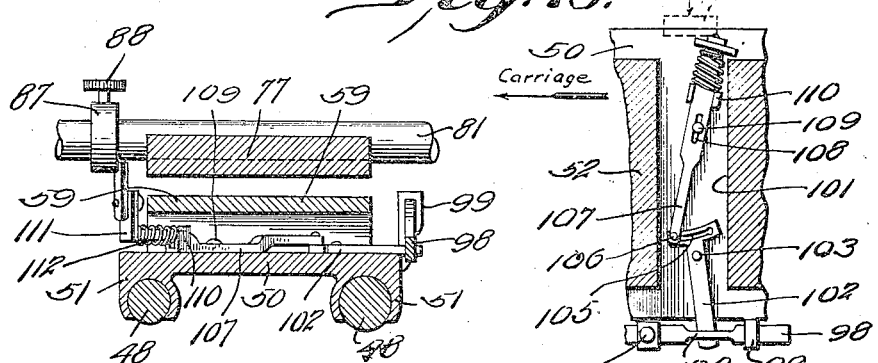

With the foregoing objects in view, the invention resides in the certain novel construction and arrangement of parts as will be hereinafter more fully described, set forth in the appended claims, and illustrated in the accompanying drawings, in which, Figure 1 is a top plan view, Figure 2 is a front elevation, Figure 3 is an end elevation, Figure 4 is a transverse section taken through the carriage, Figure 5 is a fragmentary detail section of the machine showing one end of the carriage in elevation, Figure 6 is a transverse section through the saw clamping portion of the machine and its support and showing the fastening means thereof in side elevation, Figure 7 is a sectional detail taken on the line 7—7 of Figure 3, Figure 8 is a fragmentary and sectional detail of one of the saw clamping jaw faces, Figure 9 is a fragmentary detail showing the means for locking the main fastening means in either of its operative or inoperative positions, Figure 10 is an enlarged detail of one of the gages for adjusting the height of the toothed edge of the saw above the plane of the clamping jaws, Figure 11 is an enlarged detail of the other of said gages, Figure 12 is a fragmentary detail of a portion of the trackway and the carriage carried thereby, the latter being partly in section, and showing the carriage feed mechanism in plan, Figure 13 is a fragmentary elevation of an intermediate portion of the machine showing the feed pawl and its operating mechanism, Figure 14 is a transverse section through the trackway and carriage showing the feed mechanism in elevation, and Figure 15 is a fragmentary detail, partly in section, showing the feed mechanism in position reversed to its position as shown in Figure 12.

Referring to the drawings in which similar characters of reference designate corresponding parts in the several views thereof, the invention comprises an elongated fixed jaw 10 and a correspondingly elongated movable jaw 11 between which a saw blade is adapted to be positioned with its toothed edge projecting above and in parallel relation to the top faces of the jaws. The opposed faces of the jaws 10 and 11 are formed with several longitudinally extending and aligning grooves 12 to facilitate the clamping of the saw blade in position and to act on the latter in a manner to prevent displacement thereof during the sharpening operation, also, by reason of the reduced area of contacting surfaces, tending to muffle the sound caused by the file operating on the saw blade. At one end of the fixed jaw 10, preferably the left hand end thereof, is provided a stop plate 13 which is arranged to extend across the space between the jaws and to abut the adjacent end of the saw blade when the same is in position. At the other or right hand end of the fixed jaw 10 there is provided a vertically adjustable gage member 14 which is formed with an angular bent portion 15 which overlies the space between the jaws and by means of which the projecting edge of the saw blade may be regulated for the cutting therein of teeth to a desired depth.

The jaws 10 and 11 are each formed to provide depending enlarged portions 16 and 17, intermediate their respective lengths, and the portion 16 of the fixed jaw 10 has an opening therein engaged on a pivot pin 18 carried in and projecting from the inner arm 19 of a cast housing 20. This cast housing 20 comprises the long arm 19 connected at its lower end to a short arm 21, and both of the arms 19 and 21 are formed with vertically aligning slots 22 and 23, respectively, for the reception of the movable jaw operating means and the fastening means for securing the machine, as a whole, in operative position.

The movable jaw operating means comprises a lever arm 24 which is pivoted at a point intermediate its ends, as at 25, in the upper end of the short arm 21 of the cast housing 20, and has its upper and shorter arm portion 26 provided with an inwardly projecting pivot pin 27 which is engaged in an opening formed in the enlarged depending portion 17 of the movable jaw 11. The lower end of the lever arm 24 is enlarged sufficiently to admit of the forming therein of a circular opening 28 in which is seated an eccentric disk 29 carried on a spindle 30 which projects outward at one side of the arm 21 of the cast housing 20, and terminates in an operating handle 31. By manipulating the handle 31 to adjust the eccentric disk to the full line and dotted line positions shown in Figure 6, the movable jaw 11 is moved from and to clamping position.

The fastening means, for securing the machine in position for the sharpening of saws, comprises a locking bar 32 mounted for lateral movement in the slot 22, of the long arm 19 of the cast housing 20, and the same is provided on its outer face with a plurality of outwardly and upwardly extending teeth or fastening lugs 33, which are adapted to be forced into the opposed face of the supporting elements 34 which may be of any suitable character, or made up of a number of timbers laid one on the other as shown. For operating the locking bar 32, the same is provided with spaced circular openings 35 into which are fitted eccentric disks 36 and 37, the lower of said disks (37) being secured on a spindle 38 which projects outwardly of the arm 19, of the cast housing 20, at the side of the latter opposite to that of the spindle 30 of the lever arm 24, and terminates in a handle portion 39. The upper disk 36 is mounted on a spindle 40 journaled in the walls of the slot 22 of the long arm 19 of the cast housing 20, and is arranged identically with the disk 37, without an operating handle, so as to cooperate with the latter, upon manipulation of the operating handle 39 for moving the locking bar outward and inward of the cast housing in a manner that the outer face of the same is always parallel to the face of the opposed wall of the supporting element or members 34.

For the purpose of allowing the machine to be easily handled, when not in use, or to be packed or stored away in a comparatively small space, the cast housing 20 may be swung upward in close parallel relation with the underside of the jaws 10 and 11, by reason of the pivots 18 and 27, and a fastening means is provided for holding it in either of its folded positions to the right or left hand side of the pivots, or in its lower operative position. This fastening means comprises a locking disk 41 interposed between the opposed faces of the portion 16, of the fixed jaw 10 and the long arm 19 of the cast housing 20, and a similar disk 42 interposed between the opposed faces of the portion 17 of the movable jaw 11 and the short arm 26 of the operating lever arm 24, both disks being secured against rotation by means of suitable fastenings passed through the disks and engaged in the faces of the jaws. The disks 41 and 42 are each provided with equidistantly spaced peripheral recesses 43 which are adapted to be engaged by spring actuated latches 44.

The jaw 10 is integrally formed with, or rigidly secured to several equidistantly spaced laterally extending arms or brackets 45 each of which is provided with a tooth or spur 46 adapted to be forced into engagement with the top face of the supporting element 34 and cooperate with the teeth or spurs 33 of the locking bar 32 for securing the machine in position. The top faces of the brackets 45 are disposed in a horizontal plane substantially flush with the top faces of the jaws 10 and 11 and at their free ends terminate in upstanding lug members 47. Arranged in spaced relation on and secured to the upper faces of the brackets 45 are a pair of guide rods 48 forming a trackway for supporting a tool carrying carriage. The guide rods 48 are of a greater length than the jaws 10 and 11 and are elongated beyond the right hand end of the latter, or at the end thereof opposite to the end of the jaw which is provided with the abutting plate 13.

The tool or file carrying carriage comprises a base plate 50 having depending guide eyes or members 51, the latter being engaged on the guide rods 48 by sliding movement onto the ends of the latter from the right hand end thereof. A gage plate 52 is pivoted on the base plate 50, as at 53, and extends inwardly from one end of the latter for a major portion of the length of the same. Inward from the pivot 53, the gage plate 52 is provided with a curved guide slot 54 which is engaged by an adjusting screw 55, and a second curved slot 56 is also provided, the same being in registry with a scale laid out on the upper face of the base plate 50. The forward or inner edge of the gage plate 52 is provided with an upstanding flange 57 which is engaged in an angular channel 58 formed at the inner edge of a second gage plate 59, the latter having a curved guide slot 60 formed adjacent its outer end and which is engaged by a pivot screw 60′ of a type having a thumb nut 61 associated therewith. Rising from the outer end of the gage plate 52 is an angular portion 62 to the inner face of which is pivoted, as at 63, a tool frame support 64. Immediately above the pivot 63, the support 64 is provided with a curved guide slot 65 which is engaged by a guide screw 66, the latter passing through the slot 65 and being threaded into an aligning opening formed in the portion 62. The frame support 64 is in the form of a split bearing formed to provide a lower fixed yoke portion 67 and an upper movable yoke portion 68, the latter being supported on pivots 69 and adapted to be secured onto the fixed yoke by means of the latch bolt 70 which is hinged to the latter, as at 71, and to be swung into and out of engagement with the latch plate 72 carried by the movable yoke 68. A nut 73 is threaded onto the latch bolt and is adapted to be manipulated for clamping action against the upper face of the latch plate 72 when the yokes are secured together. Rising from the plate 59 is an angular member 74 which is formed with a vertical recess 75 in which is slidably mounted the guide lug 76 of a second tool frame support 77. This frame support 77 is substantially of elongated rectangular form and has a semi-circular channel extending longitudinally of its upper face, and the same is secured with its guide lug 76 in the recess 75 by means of a guide screw 78 passing through a slot 79 formed in the vertical wall of the member 74 into the recess 75 and engaging an opening formed in the inner vertical face of the support 77. For adjusting the support 77 vertically, an adjusting screw 80 is passed through the upper horizontal wall of the member 74 and is threaded into an opening formed in the guide lug 76.

The tool or file frame comprises an open frame consisting of spaced longitudinal bars 81 and 82 and the fixed end bars 83 and 84, and slidable on the bars 81 and 82 is a bar 85, corresponding to the fixed end bars 83 and 84, which may be secured in any desired position along the bars 81 and 82 by means of a set screw 86. The free end of the bar 83 is provided with an opening into which is removably fitted the shank portion 89 of an operating handle 90, and a set screw 91 is arranged to engage the shank portion 89 of the handle to retain the latter in position. The free end of the slidable bar 85 is also formed with an opening in line with the opening of the end bar 83, into which is fitted a tool or file end supporting member 92, the latter having an elongated shank 93 extending for a distance beyond the slidable bar 85 and adapted for sliding engagement with an opening formed in the free end of the adjacent end bar 84. A set screw 94 is provided in the free end of the bar 85 for securing the supporting member 92 in position. The free ends of the bars 83, 84 and 85 are preferably inclined downwardly for purposes which will be hereinafter more fully set forth. The opposed faces of the shanks 89 and 92 are each provided with suitable openings for the reception of the opposite ends of a tool or file 95, and by adjusting the sliding bar 85 toward or from the end bar 83, tools or files of different lengths may be readily inserted into operative position. At the forward end of the base plate 50 is arranged a member formed to provide a pair of shields 49 in engagement with the rods or trackway 48, the same underlying the operative path of the file 95 and acting to prevent the filings from dropping onto the rods 48 and to clear the same in advance of the travel of the carriage.

Referring particularly to Figures 12 to 15, inclusive, a mechanism for automatically feeding the carriage along the trackway 48, either from left to right or vice versa is shown, and the same consists of a pawl 96 in engagement with the teeth of a saw clamped between the jaws 10 and 11. The pawl 96 is adjustably secured, by means of a set screw 97, on a bar 98 which is mounted for sliding movement longitudinally and at one side of the carriage and in spaced brackets or eyes 99 formed with or otherwise secured to the base plate 50 of the carriage. One end of the bar 98 is formed to provide an angularly disposed end portion 100 to give clearance thereunder to the movable plate 52. The plate 59 is undercut, as at 101, to provide a transversely extending channel for the reception of the pawl and bar operating mechanism which consists of a substantially T-shaped lever 102 having its long leg pivoted to the base plate 50, as at 103, and its outer end projecting beyond the edge of the latter and in engagement with an opening 104 formed in the bar 98 at a point adjacent the angularly disposed portion thereof. The T head of the lever 102 is slightly curved and is slotted, as at 105, and is arranged to receive screw fastening 106, carried at the inner end of an operating plunger 107, the opposite ends of the slot 105 being circular so as to admit of the proper seating of the screw 106 therein and allow of the pivoting of the levers at either of the opposite ends of the T head slot. The operating plunger 107 is formed to provide an intermediate slot 108, which is engaged on a pivot pin 109, and has its outer end passed through an eye 110 which rises from the base plate 50 of the carriage. The outer end of the plunger 107 terminates in an upstanding lug 111, and between this lug 111 and the eye 110, and surrounding the plunger 107, is a coiled spring 112. In the rearward movement of the file frame, the collar 87, which is adjustable on the center bar 81, strikes the lug 111 and moves the plunger 107 rearwardly against the tension of the spring 112, and causes the carriage to move forward the length of two teeth of the saw. When the file carrier is moved in the forward direction, the lug 111 is disengaged by the collar 87 and the spring 112 expands, moving the plunger forward the length of the slot 108, and which, in turn, actuates the lever 102 to reciprocate the bar 98 which moves the pawl 96 into the next succeeding tooth. The feeding movement of the carriage may be reversed by moving the point of connection of the plunger pin 106 from one side of the slot 105 in the T head of the lever 102.

In the assembly and operation of the parts of the machine thus provided, the saw clamp is positioned on the edge of a supporting element, as at 34, with the brackets 45 overlying the top edge, and the lugs or spurs 46 are forced downward into the surface thereof. With the inner face of the cast housing 20 abutting the vertical face of the support 34, the handle 39 is manipulated to force the locking plate 32 outward and the teeth or spurs 33 into the surface of the support. The saw can now be positioned between the jaws 10 and 11 by the manipulation of the handle 31, as before set forth, and the base plate 50 by means of the guide eyes 51, positioned for sliding movement on the trackway formed by the rods 48. The tool frame is now positioned on the carriage by opening up the yokes 67 and 68 and engaging between the same the rod 82 of the frame, and resting the rod 81 in the support 77, when the unsupported or free portions of the bars 83, 84 and 85 will extend downwardly toward the plane of the jaws 10 and 11 of the saw clamp. A tool, if not previously positioned in the frame, is now interposed between the tool supports as before described, the movable bar 85 being adjusted to suit the length of the file used.

With the machine thus assembled and set up, the carriage is now moved to the extreme end, in the present case toward the left of the trackway, and until the file intersects the first tooth of the saw blade. By the proper manipulation of the gage plates 52 and 59, loosening the thumb nut 61 for the purpose, the angular adjustment of the tool frame and the file carried thereby is made to any desired degree horizontally and within the range of the scale exposed to view through the sight opening or curved slot 56 in the gage plate 52. By manipulating the screw 80, for the vertical adjustment of the support 77 and consequently the tool frame, the depth of the cut of the saw teeth may be varied, and the angular relation of the working faces of the files may be changed as desired. This latter adjustment may also be made by simply loosening the screws 91 and 94 and turning the tool supports until the proper position of the tool is determined. This adjustment of the angular relation of the working faces of the files for determining the pitch of the teeth to be formed on the saw is, preferably, made before any consideration is given to, or made for, the depth of the cut of the saw teeth, as by the manipulation of the screw 80, and, consequently, the plates 52 and 59 are accurately set to a desired graduation on the scale above mentioned by the manipulation of the screws 91 and 94 for the proper pitch at which the teeth are to be cut or sharpened. When one angular cutting of the teeth is accomplished, the saw is reversed in the jaws 10 and 11, the working angle of the file is changed correspondingly, and the cutting operation repeated, as by reciprocating the tool frame transversely across the jaws 10 and 11 and in its supports on the carriage, the latter being fed automatically in either direction along the trackway 48 for the successive sharpening of the teeth of the saw in the manner as hereinbefore explained.

From the foregoing description of the preferred embodiment of the invention, it will be readily apparent that an extremely efficient and accurate saw sharpening machine has been provided for; that the same is adapted for extreme simplicity in assembling and mounting; that, when the tool frame and carriage is removed, the folding feature of the cast housing, with the fastening means carried thereby, admits of ease in portability, packing and storage; and that, in general, a simple, compact and comparatively light weight construction thereof is provided for.

It is to be understood that various changes in detailed construction and arrangement of parts may be resorted to without departing from the spirit and scope of the invention.

Having thus fully described the invention, what I claim, is:—

1. A saw sharpening machine including a support therefor, said machine comprising a fixed clamping jaw and a movable clamping jaw, a housing depending from said fixed clamping jaw at a point medially of the ends thereof and having a portion underlying said movable clamping jaw, fastening means carried by said housing for securing the machine in position on the support, means carried by the underlying portion of said housing for controlling the clamping action of said movable jaw, a trackway extending parallel to said clamping jaws, a carriage movable on said trackway, a tool frame movable on said carriage, and means on said carriage for angularly adjusting said tool frame.

2. A saw sharpening machine including a support therefor, said machine comprising a fixed clamping jaw and a movable clamping jaw, a housing depending from said fixed clamping jaw at a point medially of the ends thereof and having a portion underlying said movable clamping jaw, fastening means carried by said housing for securing the machine in position on the support, a lever arm pivoted in the underlying portion of said housing for operating said movable clamping jaw, means for actuating said lever arm for controlling the clamping action of said movable jaw, a trackway extending parallel to said clamping jaws, a carriage movable on said trackway, a tool frame movable on said carriage, and means on said carriage for angularly adjusting said tool frame.

3. A saw sharpening machine including a support therefor, said machine comprising a fixed clamping jaw and a movable clamping jaw, a housing depending from said fixed clamping jaw at a point medially of the ends thereof and having a portion underlying said movable clamping jaw, fastening means carried by said housing for securing the machine in position on the support, a lever arm pivoted in the underlying portion of said housing for operating said movable clamping jaw, eccentric means carried by said housing for actuating said lever arm for controlling the clamping action of said movable jaw, a trackway extending parallel to said clamping jaws, a carriage movable on said trackway, a tool frame movable on said carriage, and means on said carriage for angularly adjusting said tool frame.

4. A saw sharpening machine including a support, said machine comprising a fixed clamping jaw and a movable clamping jaw, a housing depending from said fixed clamping jaw at a point medially of the ends thereof and having a portion underlying said movable clamping jaw, fastening means carried by said housing for securing the machine in position on the support, a lever arm pivoted in the underlying portion of said housing for operating said movable clamping jaw, an eccentric carried by said lever arm, a manually operated spindle journaled in said housing for actuating said eccentric, a trackway extending parallel to and at one side of said fixed clamping jaw, a carriage movable on said trackway, a tool frame movable on said carriage, and means on said carriage for angularly adjusting said tool frame.

5. A saw sharpening machine including a support, said machine comprising a fixed clamping jaw and a movable clamping jaw, a housing depending from said fixed clamping jaw at a point medially of the ends thereof, means carried by said housing for controlling the clamping action of said movable jaw, a locking member movable in said housing for securing the machine on the support, means for actuating said locking member to and from operative position, a trackway extending parallel to and at one side of said fixed clamping jaw, a carriage movable on said trackway, a tool frame movable on said carriage, and means on said carriage for angularly adjusting said tool frame.

6. A saw sharpening machine including a support, said machine comprising a fixed clamping jaw and a movable clamping jaw, a housing depending from said fixed clamping jaw at a point medially of the ends thereof, means carried by said housing for controlling the clamping action of said movable jaw, a locking member movable in said housing for securing the machine on the support, eccentric means for actuating said locking member to and from operative position, a trackway extending parallel to and at one side of said fixed clamping jaw, a carriage movable on said trackway, a tool frame movable on said carriage, and means on said carriage for angularly adjusting said tool frame.

7. A saw sharpening machine including a support, said machine comprising a fixed clamping jaw and a movable clamping jaw, a housing depending from said fixed clamping jaw at a point medially of the ends thereof, means carried by said housing for controlling the clamping action of said movable jaw, a locking member movable in said housing for securing the machine on the support, spurs formed on the outer edge of said locking member, eccentrics carried by said locking member, an operating spindle journaled in said housing and actuating one of said eccentrics, both of said eccentrics operating to move said locking member to and from operative position, a trackway extending parallel to and at one side of said fixed clamping jaw, a carriage movable on said trackway, a tool frame movable on said carriage, and means on said carriage for angularly adjusting said tool frame.

8. A saw sharpening machine including a support, said machine comprising a fixed jaw and a movable jaw, a housing depending from said fixed clamping jaw and having a portion underlying said movable clamping jaw, means carried by the underlying portion of said housing for controlling the clamping action of said movable jaw, a vertically elongated locking member movable laterally of said housing, spurs spaced along the outer edge of said locking member, eccentrics carried by said locking member one adjacent each of the opposite ends thereof, manually operated means journaled in said housing for actuating one of said eccentrics, both of said eccentrics operating to move said locking member to and from operative position, a trackway extending parallel to and at one side of said fixed clamping jaw, a carriage movable on said trackway, a tool frame movable on said carriage, and means on said carriage for angularly adjusting said tool frame.

9. A saw sharpening machine including a support therefor, said machine comprising a fixed clamping jaw and a movable clamping jaw, means for controlling the clamping action of said movable jaw, fastening means for securing the machine in position on the support, brackets formed with said fixed jaw and extending laterally therefrom in spaced aligning relation one with respect to the other, spurs depending from the under faces of said brackets and adapted to engage the top surface of the support to further secure the machine in position on the latter, a carriage movable along said rods, a tool frame mounted for reciprocating movement transversely of said carriage, and means for angularly adjusting said tool frame.

10. A saw sharpening machine including a support therefor, said machine comprising a fixed clamping jaw and a movable clamping jaw, means for controlling the clamping action of said movable jaw, fastening means for securing the machine in position on the support, a trackway extending parallel to and at one side of said fixed clamping jaw, a carriage movable along said trackway, a gage plate pivoted for lateral movement on said carriage, a second gage plate pivoted for lateral movement on said carriage and interconnected with said first-mentioned gage plate, supports carried on each of said gage plates, a tool frame carried in said supports, and a scale of graduations associated with one of said gage plates for angularly adjusting said tool frame.

11. A saw sharpening machine including a support therefor, said machine comprising a fixed clamping jaw and a movable clamping jaw, means for controlling the clamping action of said movable jaw, fastening means for securing the machine in position on the support, a trackway extending parallel to and at one side of said fixed clamping jaw, a carriage movable along said trackway, a gage plate pivoted for lateral movement on said carriage, a second gage plate pivoted for lateral movement on said carriage and inter-connected with said first-mentioned gage plate, a split bearing carried on one of said gage plates, an open support on the other of said gage plates, means for adjusting said open support vertically, a tool frame mounted in said split bearing and said open support, and a scale of graduations associated with one of said gage plates for angularly adjusting said tool frame.

12. A saw sharpening machine including a support therefor, said machine comprising a fixed clamping jaw and a movable clamping jaw, means for controlling the clamping action of said movable jaw, fastening means for securing the machine in position on the support, a trackway extending parallel to and at one side of said fixed clamping jaw, a carriage movable along said trackway, a gage plate pivoted for lateral movement on said carriage, a second gage plate pivoted for lateral movement on said carriage and inter-connected with said first mentioned gage plate, a support pivoted for movement laterally of one of said gage plates, a split bearing carried on said pivoted support, means for adjusting said support and the split bearing carried thereby angularly in a plane vertically of said carriage, an open support on the other of said gage plates, means for adjusting said open support vertically, a tool frame mounted in said split bearing and said open support, and a scale of graduations associated with one of said gage plates for angularly adjusting said tool frame.

13. A saw sharpening machine including a support therefor, said machine comprising saw clamping jaws, means depending from one of said jaws for securing the machine in position on the support, means for controlling one of said jaws for clamping action with respect to the other of said jaws, a trackway extending parallel to said clamping jaws, a carriage movable on said trackway, a file carrying frame movable on said carriage, means on said carriage for angularly adjusting said file carrying frame, and means operative through movements of the file carrier by said file carrying frame for feeding said carriage in either direction of its travel along said trackway.

14. In a saw filing machine including a saw clamp, a file carrying carriage movable at one side and longitudinally of said saw clamp, and means operable when the filing means has reached a predetermined position for intermittently feeding said file carrying carriage in either direction of its travel.

15. In a saw filing machine including a saw clamp, a file carrying carriage movable at one side and longitudinally of said saw clamp, and means operable when the file has reached a predetermined position for automatically and intermittently feeding said file carrying carriage in either direction of its travel.

16. In a saw sharpening machine, a housing, relatively adjustable jaws pivotally connected with said housing, the said housing adapted to turn upon said pivotal connection, and locking members carried by said housing and cooperating with the said jaws to hold the same in angular positions relative to said housing.

17. In a saw sharpening machine, a housing, relatively adjustable jaws, each pivotally connected with said housing, plates secured to said jaws concentrically with said pivotal connections, the said plates having notched edges, and locking pawls carried by said housing and engageable in said notches.

18. In a saw sharpening machine, a housing, arms extending angularly from said housing and adapted to engage a support, a locking bar movable at an angle toward or away from said arms, grip members carried by said bar, and means for moving said bar to adjust the grip members into and out of working position.

19. In a saw sharpening machine, a housing, arms extending angularly from said housing and adapted to engage a support, a locking bar carried by said housing and movable angularly toward or away from said arms, gripping teeth in said bar adapted to engage in said support, and cams for moving said bar so as to adjust said gripping teeth into and out of working position.

20. In a saw sharpening machine, a housing, arms extending beyond said housing at substantially right angles thereto and adapted to engage a support, a locking bar slidable upon said housing at right angles to said arms, grip teeth on said bar adapted to engage in a side of said support, and cams carried by said housing and adapted to move said bar so as to adjust said grip teeth into and out of working position.

21. In a saw sharpening machine, a base plate, a gage plate movable upon said base plate for setting a tool at different working positions, a carriage on said gage plate, means for adjusting one side of said carriage vertically, and a tool carried by the said vertically adjustable side of said carriage.

22. In a saw sharpening machine, a base plate, a gage plate pivoted upon said base plate for adjustment to set a tool at different working positions, means for holding said gage plate against movement, a carriage mounted for sliding movement upon said gage plate, means for adjusting one side of said carriage vertically, a tool carried by the said vertically adjustable side of said carriage, and means for holding said tool in position.

23. In a saw sharpening machine, a carriage mounted above the toothed edge and adapted to travel longitudinally of the saw, a tool on said carriage reciprocable laterally of the saw, a pawl on said carriage adapted to engage with the teeth of the saw, and means operable when the tool reaches a predetermined position for causing the pawl to pass upon a saw tooth to move the carriage a predetermined distance.

24. In a saw filing machine, a carriage movable above and longitudinally of the toothed edge of a saw, a pawl on said carriage engageable with the teeth of the saw, a rock arm in connection with said pawl, a sliding rod connected with said rock arm, a tool slidable upon said carriage, and means operable when the tool is moved a predetermined distance in one direction to operate said slide bar and to swing said rock arm so that said pawl will fulcrum on one of the teeth of said saw.

25. In a saw sharpening machine, a carriage movable relatively to the saw, a pawl on said carriage adapted to engage the saw, a rock arm connected to said pawl to move the same in one direction, a plunger connected to said arm adapted to move the latter in one direction, a tool slidable upon said carriage and adapted when moved a predetermined distance in one direction to engage said plunger and to cause said pawl to change its fulcrum upon said saw, and a spring for returning said plunger to normal position when said tool slides in the opposite direction and to move said carriage with said pawl as a fulcrum.

In testimony whereof I affix my signature.

JAMES E. MEED.